May 9, 1950

J. W. THROCKMORTON ET AL
BUBBLE TOWER CONSTRUCTION AND METHOD
OF FRACTIONATING VAPORS
Filed Nov. 17, 1947

2,507,325

INVENTORS.
John W. Throckmorton
John S. Wallis
BY
ATTORNEY.

Patented May 9, 1950

2,507,325

UNITED STATES PATENT OFFICE 2,507,325

BUBBLE TOWER CONSTRUCTION AND METHOD OF FRACTIONATING VAPORS

John W. Throckmorton and John S. Wallis, New York, N. Y., assignors to Petro-Chem Process Company Incorporated, New York, N. Y., a corporation of Delaware Application November 17, 1947, Serial No. 786,380

11 Claims. (Cl. 261—114)

This invention relates to improvements in a method of fractionating vapors and the fractionating tower construction used in connection therewith and refers more particularly to an improved type of bubble cap arrangement employed in a fractionating tower wherein are maintained a plurality of superimposed pools of liquid for contacting vapor phase and liquid phase material. Although this invention is described in connection with fractionating towers, it is equally applicable to any apparatus where separation of liquid and vapors, with a minimum of entrainment, is desirable; such as boiler drums, reboilers, evaporators, and in similar or related uses.

In the conventional tower utilizing bubble caps vapor is passed from the bottom to the top of the tower, bubbling first through the liquid on the lowest tray, thence through the liquid pools on the successive trays above where it is intimately contacted with the liquid. Vapor released from the surface of each successive pool flows to the tray above and excessive condensed liquid flows through down pipes to the tray below. As the capacity of the tower is increased, or as a greater volume of vapor passes through the pools, turbulence becomes more violent and the capacity of this type of tower is determined by the entrainment from one tray to another. The proposed construction is similar to the conventional tower in but one respect, that it employs a plurality of vertically arranged pools of liquid supported on trays. In each of the contacting units or stages corresponding to the pools are located a plurality of bubble caps in whose construction resides one of the features of novelty.

Instead of surmounting the vapor riser with inverted cups to cause the vapors to bubble through the pools of liquid in the conventional manner, the liquid and vapors are brought into intimate contact in a zone separated from the pools of liquid and the separation between the liquid and vapors is made in downcomer pipes. The downcomers may be an integral part of each bubble cap which diminishes turbulence within the pools of liquid and reduces objectionable entrainment.

An object, therefore, of the invention is to provide a method of fractionating vapors by intimately contacting the vapor and liquid during passage through a plurality of vertically arranged stages and effecting the contact and separation of the liquid from the vapors in a confined space separate from the pools of liquid.

A further object is to provide a construction in which contact between the vapor and liquid is accomplished with a minimum of entrainment upon subsequent separation.

Another object is to provide a construction for contacting vapor and liquid wherein after intimate contact the liquid is passed downwardly in a thin film to the liquid pool below and the vapor is released from the downflowing film of liquid affording a large vapor liberating surface and ideal conditions for vapor separation.

Another object is to utilize the kinetic energy of the vapors in flowing between stages to perform a jetting action and thus entrain liquid and form a mixture from which vapors are subsequently released.

Other and further objects will appear from the description which follows.

In the accompanying drawings which form a part of the instant specification and are to be read in conjunction therewith and in which like reference numerals indicate like parts in the various views, there is shown a construction embodying the invention.

Figure 1:
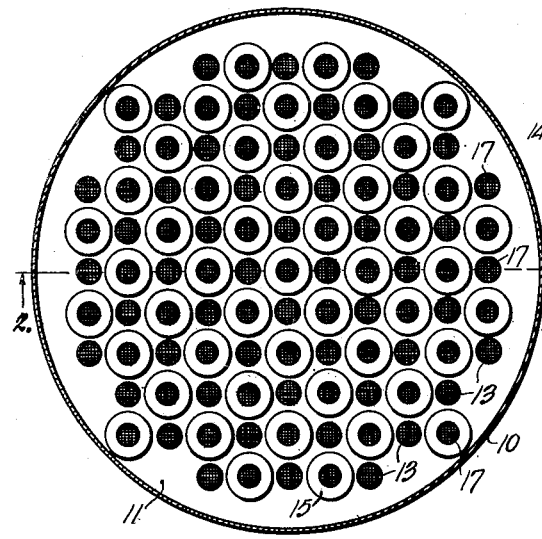
Fig. 1 is a sectional view taken through a tower above one of the liquid pools looking downwardly.
Figure 3:
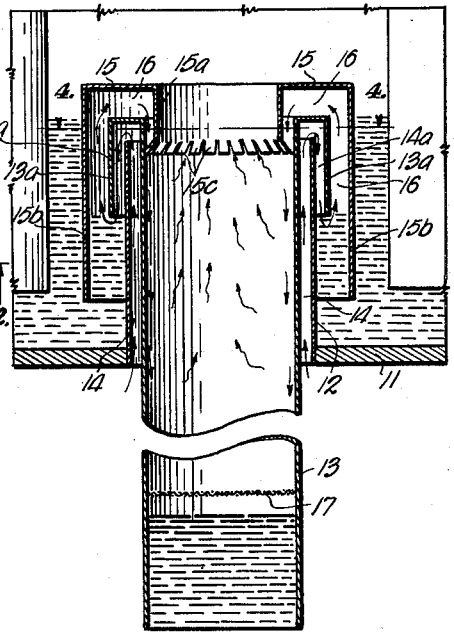
Fig. 3 is an enlarged vertical section taken through one of the bubble caps.
Figure 2:
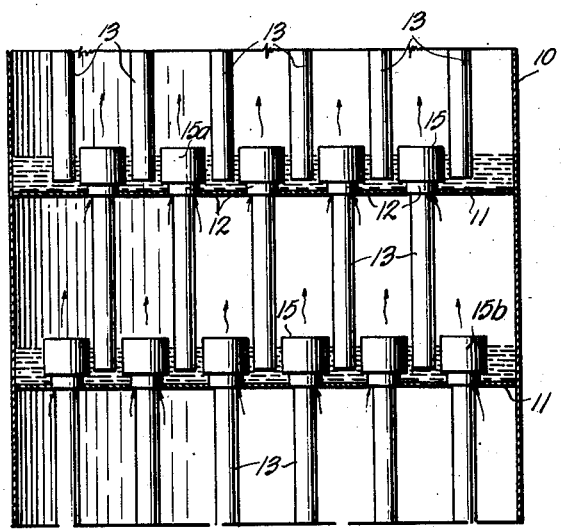
Fig. 2 is a view taken along the line 2—2 in Fig. 1 in the direction of the arrows.
Figure 4:
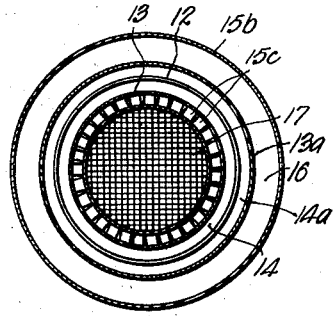
Fig. 4 is a view taken along the line 4—4 in Fig. 3 in the direction of the arrows.

Referring to the drawings, at 10 is shown a portion of the shell of the bubble tower at an intermediate location. Within the tower and united to the inner wall by liquid tight seals are circular horizontal partitions or trays 11. The distance between the trays and the number of trays in the tower is determined by the particular fractionating job which is to be accomplished. Fitted into apertures in the trays are short cylindrical pipes or vapor-risers 12. Supported within the vapor-risers and of somewhat less diameter are downcomer pipes 13. The lower ends of downcomer pipes supported on one tray are immersed in the pool of liquid supported on the tray below, as indicated in Figs. 2 and 3. Although we have described the downcomers or downpipes as being sealed in the liquid in the tray below, they may as well be separately sealed by having their lower extremities immersed in smaller individual pools of liquid contained in cups or inverted caps positioned above the liquid level of the tray below. As illustrated in Figs. 3 and 4 the upper end of the downcomer pipe is doubled back in the form of a reverse lip or depending skirt 13a. The top of the riser 12 extends up into the annular space between lip 13a and the outer wall of the downcomer 13 forming an annular passageway 14 between the riser and the outer wall of the downcomer. This passageway reverses its direction at the top of the riser following the annular space between the outer surface of the riser and the inner surface of the depending lip 13a of the downcomer. This latter annular passageway has been designated 14a in the drawing. Arranged above the top of the riser-downcomer pipe assembly and spaced therefrom are annular hoods or caps 15 having a short depending inner skirt 15a and an outer skirt of greater length 15b. The brackets which support both the downcomer pipes and hood members are not shown in the drawings but may be any suitable vertical fin arrangement or straps which will hold the members in rigid spaced apart relation. The lower edge of the inner short skirt 15a is preferably flared outwardly toward the inner wall of the downcomer pipe and serrated as shown at 15c. The outer depending skirt 15b of the hood is deeply immersed in the pool of liquid supported on the tray. Locating the hood in this fashion above the downcomer pipe forms continuous annular passageways 16 between the outer surface of the lip formed on the downcomer and the inner surface of the hood. This passageway communicates with passageway 14a at the lower rim of the depending lip of the downcomer and reverses the flow of vapors at this point. The travel of the vapors and liquid beneath the hood is over the top of the depending lip of the downcomer and thence into the downcomer pipe due to the baffling effect of the annular skirt 15a.

With the risers, downcomers and hoods assembled in the manner described, and with liquid accumulated on the trays at the depth indicated, vapors rising through the tower will flow upwardly through annular passageways 14 over the top of the risers and downwardly through passageways 14a. At the lower rim of lips 13a of the downcomers the vapors mix with the liquid due to the jetting action of the vapors rising through the vapor risers 12. While in intimate contact the mixture is confined within the enclosed space formed by the skirt 15b. Uncondensed vapor and entrained liquid passes thence upwardly through passageways 16 over the top of the downcomer and into its interior. Skirt 15a directs the vapor and entrained liquid onto the interior wall of the downcomer where it is discharged in a thin liquid film. At the lower extremity of skirt 15a outward flaring of the rims and serrations 15c break up the mixture and facilitate separation of the vapor from the liquid. The downcomers unlike those in ordinary bubble towers constitute the zones where vapors and liquids are separated.

Located within the lower portion of each downcomer is a grid or screen 17; the function of this grid is to supplement the action of serrations 15c and promote disruption of bubbles tending to form within the downcomer, or frothing which may occur in the mixture. These grids to be effective must be located above the level of the liquid pool in which the lower extremities of the downcomers are immersed. Discharge of the liquid-vapor mixture onto the inner wall of the downcomers through the serrations produces a thin liquid film on the walls and a spray within the downcomers so that the liquid particles are condensed and flow normally in a downward direction to the liquid pool on the tray below while the vapors rise and pass out of the top of the downcomers into the vapor space above. During the passage of the film along the inner wall of the downcomer, release of vapors from the liquid is effected without producing turbulence in the large liquid pools supported on the trays. Furthermore, a large liberating surface is afforded by the plurality of downwardly moving films in the respective downcomers. The only opportunity for the production of turbulence within the liquid pools is where the vapor contacts the liquid beneath the hoods. The hoods form partially independent supplemented pools and due to the fact that the annular columns of liquid are confined where this contact takes place, the exposed surface of the large liquid pools is relatively unaffected and quiescent until capacity of the tower is increased to the extent that these annular liquid columns are depressed and vapor escapes around the lower rim of the outer skirt of the hood. Obviously such operation would rarely occur and is readily controlled by regulating vapor velocity.

It will be noted that a more uniform distribution of the vapor-liquid contact in the respective pools is obtained by this type of bubble cap construction. The capacity of a fractionating tower can be greatly increased by installation of this type of bubble cap construction and the spacing of trays is not much a vital matter since separation of liquid from vapor is within the downcomers and not in the vapor space between trays.

The method and construction provide an arrangement by which there is acumulated on the trays bodies of liquid more nearly the same boiling point than can be produced in the conventional type of bubble tower, making for more accurate fractionation of the materials passed through the tower.

Since tower sizes can be reduced without sacrificing capacity or reduction in fractionating accomplishments, the method and construction greatly reduces capital and operating expenses. The invention is applicable to the treatment of any fluid material where it is desirable to effect fractionation. It is particularly adaptable to the oil and chemical inducties where close fractionation of liquid and vapor materials is essential.

Bubble towers embodying the invention would ordinarily employ a large number of downcomers, each with its cap and hood construction, but it will be understood that the invention may be employed by the use of one or more on each tray and that parts of the tower may embody the invention and other arrangements may be used on other trays.

From the foregoing it will be seen that the invention is well adapted to attain all of the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the drawings is to be interpreted as illustrative and not in a limiting sense.

Having thus described our invention, we claim:
1. A fractionating tower of the character de- scribed comprising a vertical vessel having a plurality of stages arranged one above the other in which vapors and liquid are intimately contacted, each stage including a tray upon which is supported a pool of liquid, a vertical open-ended downcomer pipe spanning two stages, its upper end extending above the liquid level on one tray and having a reversed lip forming an annular space with the outside of the pipe, its lower end immersed in the liquid pool on the tray below, a vaporiser surrounding the upper portion of the downcomer pipe and extending into the reverse lip to form a continuous annular passageway with the pipe and lip portion, an annular hood having inner and outer depending portions spaced from and covering the top of the pipe and lip, the inner depending portion forming an annular passageway with the inside wall of the pipe, the outer depending portion forming a passageway with the reverse lip with its lower edge immersed in the liquid pool of the upper tray, said hood shrouding the top of the pipe and reverse lip to form a passageway which constitutes a continuation of the passageway formed by the top of the riser and the reverse lip of the downcomer pipe.

2. A tower as in claim 1 with an outwardly flaring baffle on the inner edge of the annular hood whereby the liquid-vapor mixture is directed toward the inside wall of the downcomer pipe.

3. A tower as in claim 1 with an interrupter in the downcomer pipe above the level of the lower pool for disrupting bubbles formed therein.

4. A bubble cap construction for fractionating towers having vertically spaced trays comprising an open ended downcomer pipe having a turned back lip at its upper end, said downcomer adapted to extend from substantially the liquid level on one tray to below the liquid level of the pool on the tray below, a riser concentric with and surrounding the downcomer with an upper end projecting into the turned back lip of the downcomer to form a continuous two-way passageway therein, the lower end of the riser mounted in an aperture in the tray of the tower through which its companion downcomer passes and an annular hood spaced from and shrouding the turned back lip of the downcomer.

5. A bubble cap as in claim 4 in which the annular hood forms a continuation of the passageway produced by the riser and turned back lip of the downcomer.

6. A fractionating column comprising a series of superimposed trays for supporting pools of liquid, relatively short vapor risers mounted in openings in each tray and extending above the liquid level therein, downcomer pipes mounted within the vapor risers and spaced inwardly therefrom to provide narrow annular vapor passages, said downcomer pipes having skirts at the top overhanging the upper ends of the vapor risers and extending below the liquid level in the tray, and bubble caps overhanging the upper ends of the downcomer pipes and forming in conjunction with the vapor risers and with the skirts at the upper ends of the downcomer pipes supplemental annular pools of liquid, a tortuous vapor passage through the supplemental pool above the liquid level in the tray and means for discharging the mixture of vapor and liquid downwardly into the top of the downcomer pipes, said bubble caps having vapor outlets to permit the free upward flow of vapors separated from the mixture in the downcomer pipes.

7. A fractionating column comprising a series of superimposed trays for supporting pools of liquid, relatively short vapor risers mounted in openings in each tray and extending above the liquid level therein, downcomer pipes mounted within the vapor risers and spaced inwardly therefrom to provide vapor passage, said downcomer pipes having skirts at the top overhanging the upper ends of the vapor risers and extending below the liquid level in the tray, and bubble caps mounted at the tops of the downcomer pipes and formed with inner sleeves extending into the top of the downcomer pipe to form an annular inlet and outer sleeves extending well below the liquid level in the tray outside of the skirts which depend from the upper end of the downcomer pipes whereby an annular tortuous passage is formed at each downcomer pipe which directs vapors from the space below upwardly outside the downcomer pipe and within the vapor risers, downwardly outside the vapor risers and within the skirt of the downcomer pipe and upwardly through the liquid body partially segregated under the cap and downwardly through discharge openings within the upper ends of the downcomer pipes.

8. A method of fractionating a fluid mixture containing components of different volatilities in a column including vertically spaced trays having associated vapor risers and downcomers for maintaining vertically spaced liquid pools in the column which method comprises causing an upwardly flowing stream of vapor to impinge upon a partially confined portion of the liquid to remove said portion from the pool and to form a vapor-liquid mixture, conducting the mixture in a confined stream and discharging said mixture downwardly into the top of the downcomer, maintaining the liquid level in the downcomer adjacent its lower end to establish a separating zone in the upper and intermediate portions of the downcomer, separating the vapors from the entrained liquid in said zone and discharging the separated vapors upwardly from the top of the downcomer.

9. A method as in claim 8 in which the upwardly flowing stream of vapor acts as a jet to forcibly advance the vapor-liquid mixture.

10. A fractionating column comprising a series of superimposed trays for supporting pools of liquid, vapor risers set in each tray extending above the liquid level in the tray and downcomer pipes mounted within the vapor risers and extending from above the liquid level in the tray downwardly beneath the liquid level in the tray below, the downcomer pipes being of such size as to form an annular path for the rising vapors and having means for directing the vapors downwardly outside of the risers, and bubble caps mounted on the risers and formed to provide jointly with the upper ends of the downcomer pipes supplemental liquid pools through which the vapors must pass so as to entrain liquid, said bubble caps having a portion for forcing the mixture of vapor and liquid to enter the top of the downcomer pipes and having an opening for permitting the vapors which are separated in the downcomers to flow upwardly into the vapor space above.

11. A fractionating column comprising a series of superimposed trays for supporting pools of liquid, relatively short vapor risers mounted in openings in each tray and extending above the liquid level therein, downcomer pipes mounted within the vapor risers and spaced inwardly therefrom to provide vapor passages, said downcomer pipes having skirts at the top overhanging the upper ends of the vapor risers and extending below the liquid level in the tray and annular caps having outer skirts for segregating partially independent liquid pools through which vapors from the risers pass and produce a vapor-liquid mixture which is carried above the liquid level in the tray, said annular caps having inner skirts extending within the downcomer pipes for forcing the vapor-liquid mixture to be discharged into the upper ends of the downcomer pipes and affording an open upward passage for vapors which are separated from the mixture in the downcomer pipes.

JOHN W. THROCKMORTON.
JOHN S. WALLIS.

REFERENCES CITED

The following references are of record in the file of this patent:

UNITED STATES PATENTS

| Number | Name | Date |
|---|---|---|
| 1,624,793 | Mann | Apr. 12, 1927 |
| 1,651,354 | Alexander | Dec. 6, 1927 |
| 1,741,519 | Huff | Dec. 31, 1929 |
| 1,744,543 | Grace | Jan. 21, 1930 |
| 1,808,088 | Urquhart | June 2, 1931 |
| 1,948,500 | Bielfeldt | Feb. 27, 1934 |
| 2,150,498 | Geddes et al. | Mar. 14, 1939 |
| 2,345,667 | Hachmuth | Apr. 4, 1944 |